UNITED STATES PATENT OFFICE.

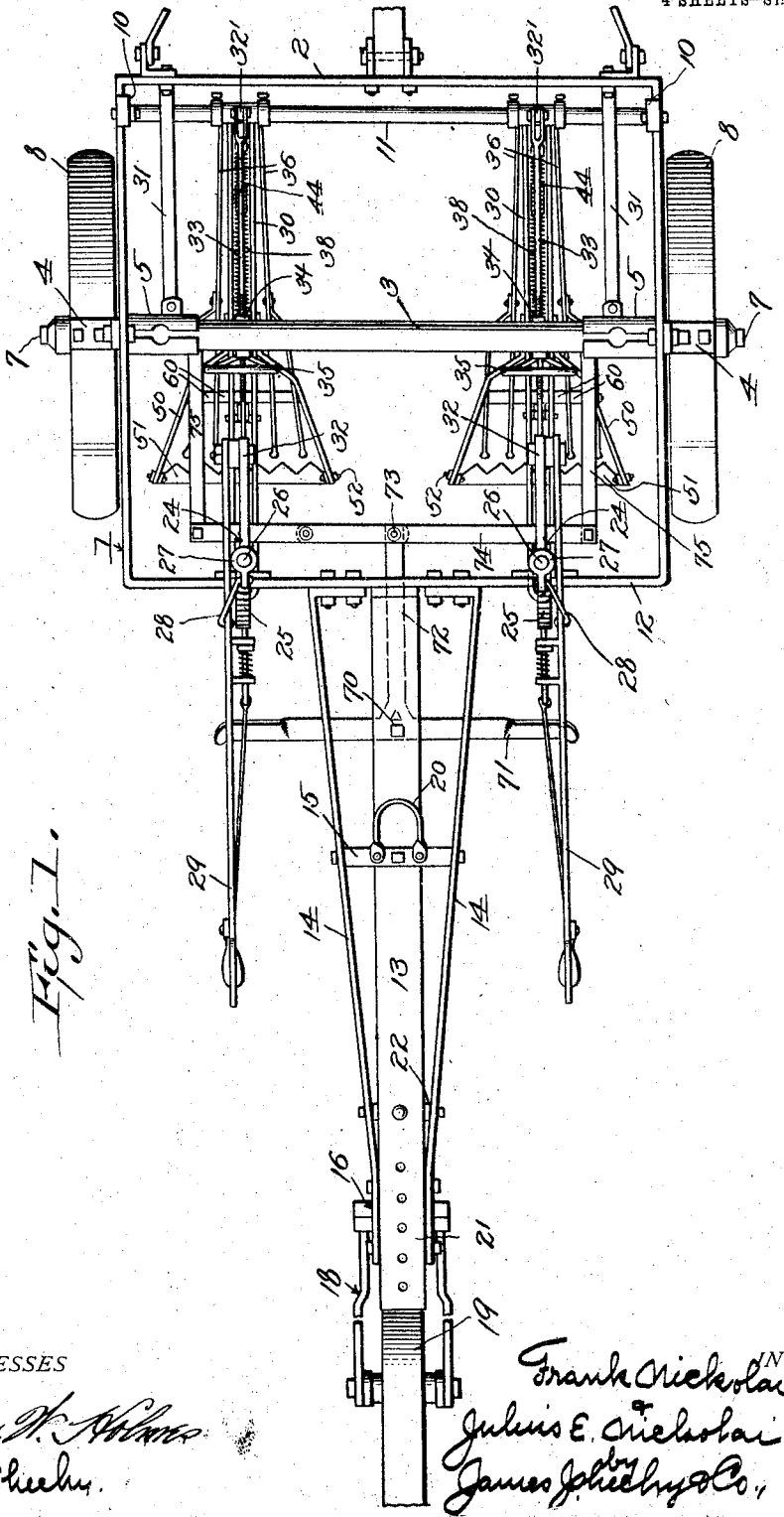

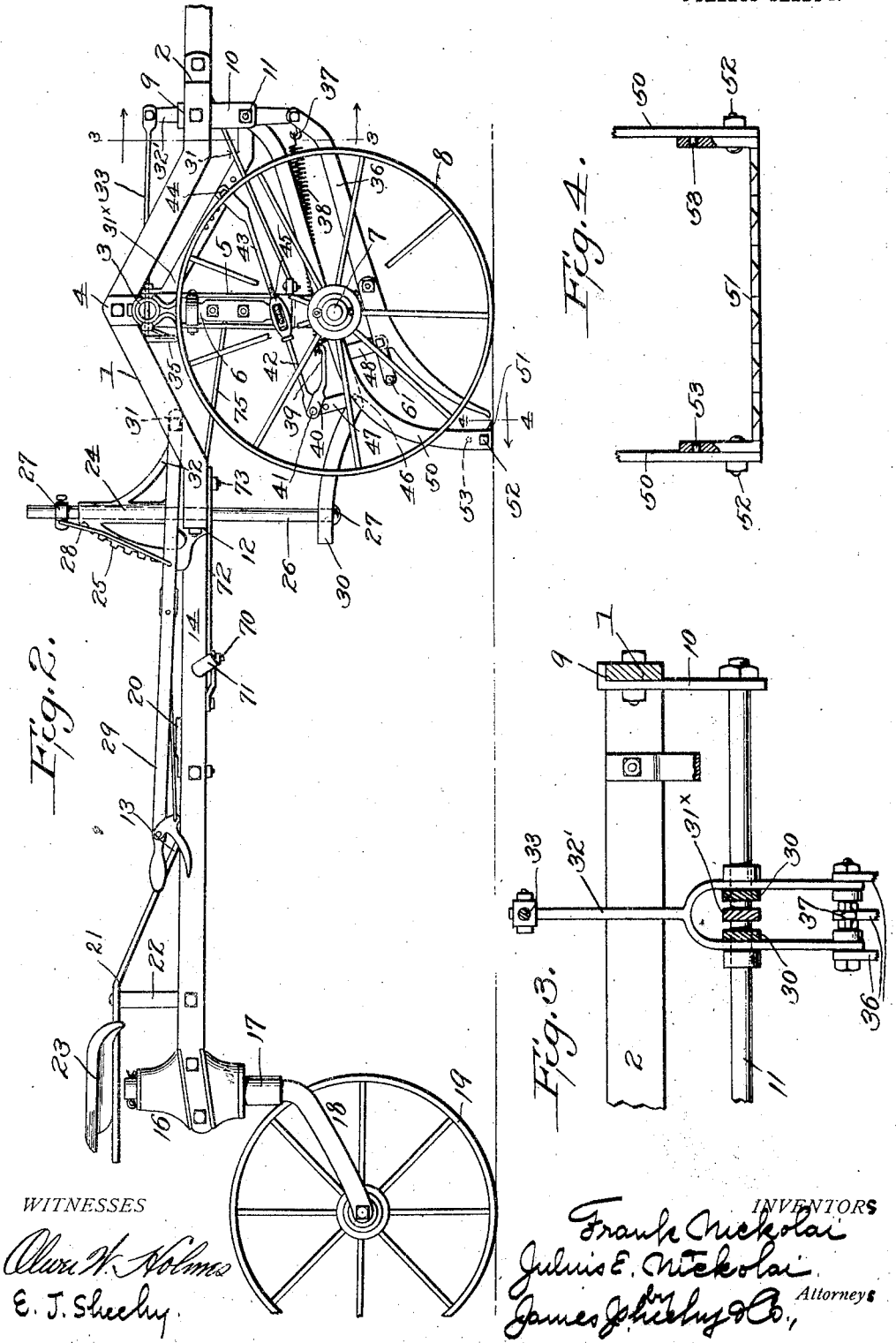

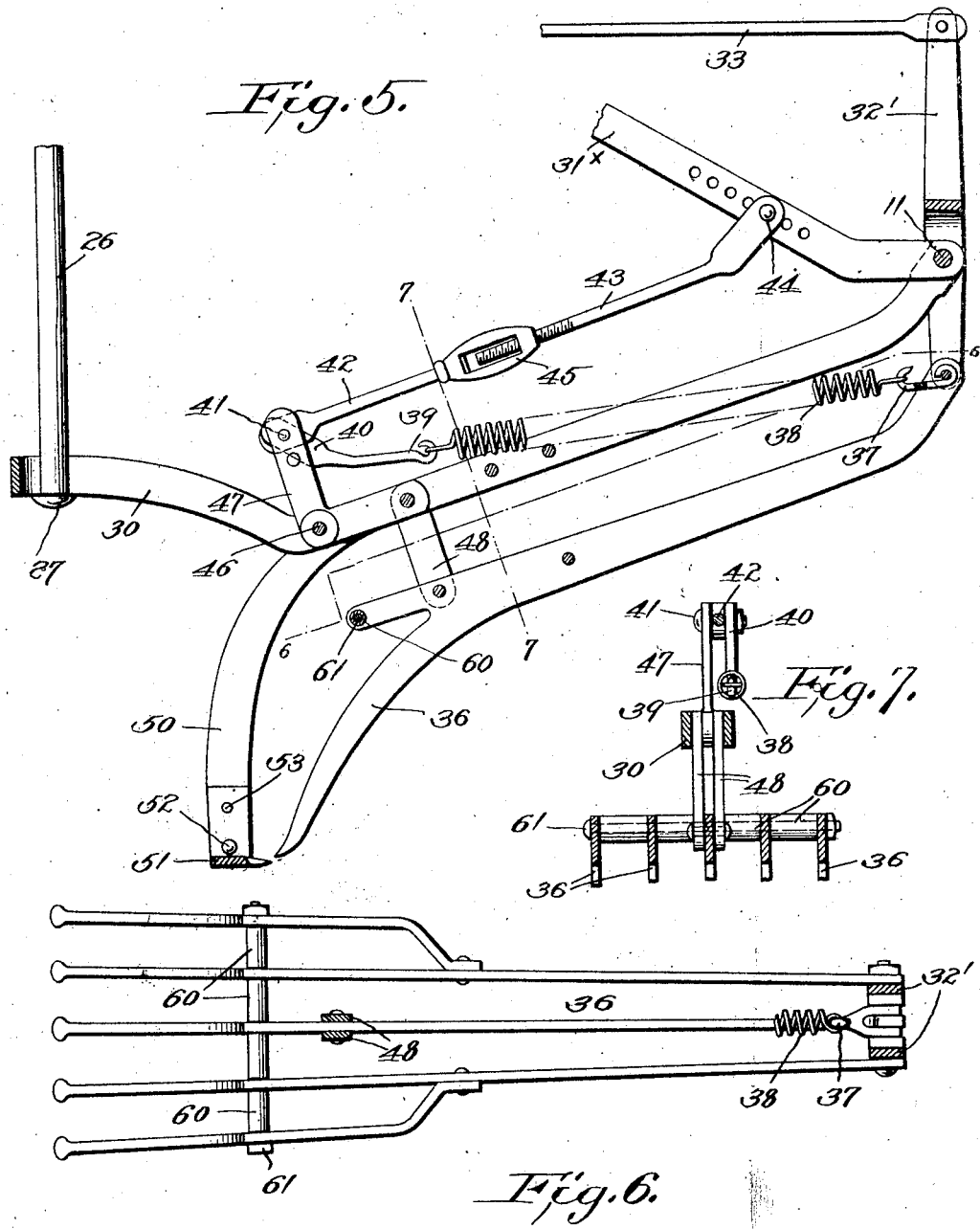

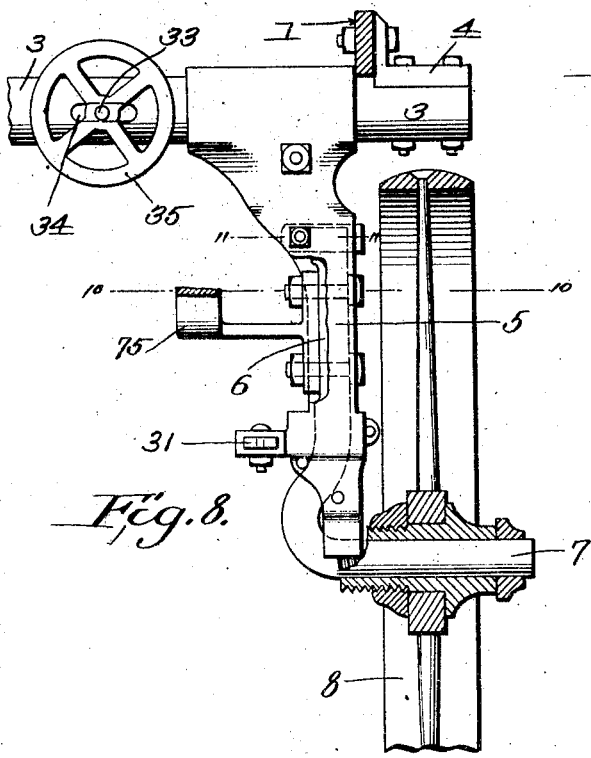
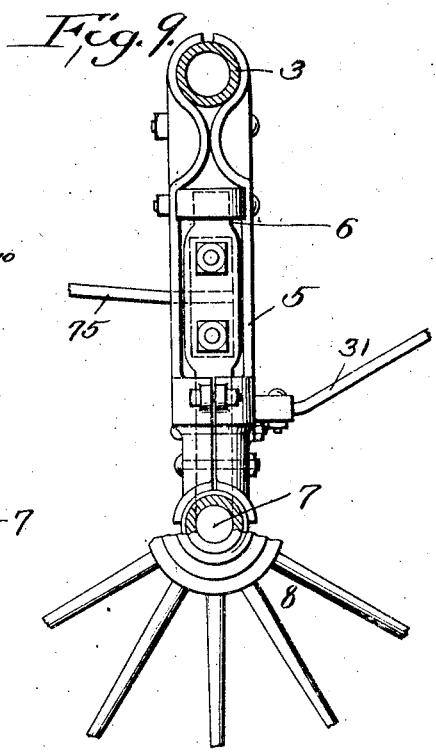
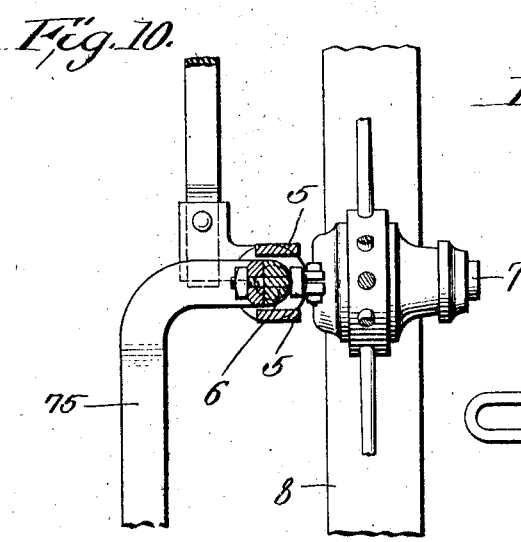
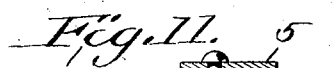
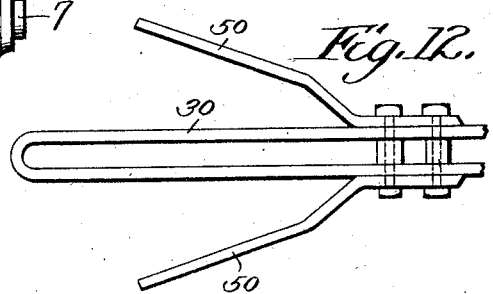

FRANK NICKOLAI AND JULIUS E. NICKOLAI, OF DE BEQUE, COLORADO.

BEET-TOPPING MACHINE.

1,056,708.  Specification of Letters Patent.  Patented Mar. 18, 1913.

Application filed May 16, 1912. Serial No. 697,688.

*To all whom it may concern:*

Be it known that we, FRANK NICKOLAI and JULIUS E. NICKOLAI, citizens of the United States, residing at De Beque, in the county of Mesa and State of Colorado, have invented new and useful Improvements in Beet-Topping Machines, of which the following is a specification.

Our present invention pertains to the topping of sugar beets; and it contemplates the provision of an efficient machine of light draft for topping sugar beets in the rows precedent to plowing the beets out of the ground so that the same can be expeditiously and easily harvested, and one that is well adapted to accommodate itself to and efficiently cut beet tops of different sizes as the same are encountered during the progress of the machine across a field.

Other objects and advantageous characteristics of the invention will be fully understood from the following description and claims when the same are read in connection with the drawings, accompanying and forming part of this specification, in which:

Figure 1 is a plan of the machine constituting the best practical embodiment of our invention that we have as yet devised. Fig. 2 is a side elevation of the same. Fig. 3 is an enlarged detail transverse section taken in the plane indicated by the line 3—3 of Fig. 2, looking forward. Fig. 4 is an enlarged detail view, partly in elevation and partly in section, taken in the plane indicated by the line 4—4 of Fig. 2, looking rearward, and illustrating the manner of mounting each of the blades. Fig. 5 is a detail longitudinal vertical section illustrative of a group of coöperating elements. Fig. 6 is a detail plan illustrating a group of the gage shoes. Fig. 7 is a transverse section taken in the plane indicated by the line 7—7 of Fig. 5. Figs. 8 and 9 and 10 are detail views illustrative of the manner of mounting the forward ground wheels; Fig. 10, being taken in the plane indicated by the line 10—10 of Fig. 8. Fig. 11 is a detail section taken in the plane indicated by the line 11—11 of Fig. 8. Fig. 12 is a fragmentary plan showing one of the levers 30 and the manner of connecting the knife-carrying bars therewith.

Similar numerals of reference designate corresponding parts in all of the views of the drawings.

Among other elements our novel machine comprises a main frame that is rectangular in plan and has side bars 1 which in side elevation describe obtuse angles with the apices of the angles uppermost as shown in Fig. 2. On its front bar 2 the main frame is preferably so equipped that either a pole or a pair of thills can be attached to the same in the discretion of the party using the machine. Extending transversely of the main frame and disposed below the upper portions of the side bars 1 is a tubular bar 3 that is fixedly connected to the said side bars through the medium of angle irons 4, bolted to the side bars and the tubular bar. Fixed on and depending from the tubular bar 4 at points adjacent the inner sides of the side bars 1 are hangers 5 the lower portions of which are of open form, and journaled in said hangers are upright rock-shafts 6, equipped with spindles 7 on which are mounted the forward ground wheels 8. The construction described constitutes our preferred mode of connecting the forward ground wheels 8 with the main frame. We would have it understood in this connection, however, that the ground wheels 8 may be connected with the tubular bar 4 and the main frame in any manner compatible with our invention without involving departure from the scope of the same as claimed.

Fixed at the inner sides of the forward portions of the frame bars 1 and bearing at 9 on the upper edges of said bars are hangers 10, and secured in and extending between the said hangers 10 is a transverse rod 11. Fixed to and extending rearward from the rear bar 12 of the main frame is a longitudinal-central bar 13, and also fixed to and extending rearward from said bar 12 are braces 14 for the bar 13. The said braces converge rearwardly and are fixedly connected at intermediate points of their length with the bar 13 through the medium of a cross-bar 15. The rear portions of the bars 14 are fixedly connected with a suitable boxing 16, and the said boxing 16 loosely receives and is supported on the vertical stem 17 of a horizontally swinging frame 18 in which is mounted a caster wheel 19. The adaptability of the frame 18 and wheel 19 to swing horizontally contributes in the ordinary well known manner to the facility with which the machine can be guided. It will be noticed that the bar 13 is disposed with its greatest width horizontal while the braces 14 are arranged with their greatest widths vertical, and consequently the rearward extension of the main frame, formed by the said bars 13 and 14, is rendered stiff and strong.

At 20 on the bar 13 we preferably employ a holder for an oil can. The bar 13 merges at its rear end into a spring bar 21 which is carried rearwardly over and connected to a support 22 that is, in turn, fixedly connected to the bars 14. On its rear portion the spring bar 21 carries a driver's seat 23. Fixed on the rear bar 12 of the main frame are two castings each of which comprises a vertically-disposed sleeve 24 and a segmental rack 25, and movable vertically through the sleeves 24 are rods 26 having enlargements 27 at their lower ends. On the upper portions of the rods 26 are fixedly mounted collars 27 which are connected through rods 28 with vertically-swinging levers 29, equipped with detents for coöperation with the racks 25. The said levers 29 are fulcrumed at 31 on forwardly-extending portions 32 carried by the said castings.

Pivoted to swing vertically on the transverse rod 11 are levers 30. Each of these levers is formed of a strap of metal bent upon itself, and in the loops at the rear ends of the levers are arranged the rods 26; the enlargements 27 of the rods being disposed below the levers, whereby when the rods 26 are moved vertically through the medium of the hand levers 29 the levers 30 will be swung vertically, and when the levers 29 are adjustably fixed, the levers 30 will also be adjustably fixed. In this manner the driver of the machine is enabled to secure the topping knives and the gaging shoes, hereinafter described, in and out of their working positions.

Interposed between and connected to the lower portions of the hangers 5 and the front bar 2 of the main frame are braces 31, Figs. 1 and 2, and pivotally mounted on and held against lateral movement on the rod 11 are vertically-swinging levers 32' which extend above and below the rod as shown, and have their lower arms bifurcated. The upper arms of the said levers 32' are pivotally connected to the bifurcated forward ends of threaded rods 33, and the said rods 33 are extended rearwardly and loosely through slots 34 in the tubular crossbar 3, and are equipped in rear of the said bar with nuts 35 which are preferably in the form of hand wheels as shown. The said nuts 35 bear against the rear side of the bar 3, and hence it will be manifest that when the nuts are turned in one direction the lower and bifurcated arms of the levers 32' will be swung forward, while when the nuts are turned in the opposite direction said bifurcated arms of the levers 32' will be swung rearward.

Suitably hinged to the lower ends of the levers 32' are vertically-swinging gaging shoes 36, of which there are, by preference, five to each lever 32', and also connected to the lower ends of the levers 32' are hooks 37 which serve for the connection of rearwardly-extending retractile springs 38 of which there is one to each lever 32'. The said springs 38 pass loosely between the bars comprised in each lever 30 and are connected at their rear ends to hooks 39 on the forward ends of links 40. The links 40 are pivotally connected at 41 to the rear members 42 of auxiliary supports, the forward members 43 of which are pivotally connected at 44 to braces 31ˣ interposed between and connected to the tube 3 and the rod 11. The rear threaded portions of the members 43 are disposed in interiorly threaded enlargements 45 on the forward ends of the members 42. When the members 43 are disconnected from the braces 31ˣ they may be turned in the interiorly threaded enlargements 45 to increase or diminish the length of the auxiliary supports. It will also be noted here that the braces 31ˣ are each provided with a plurality of apertures so that the forward ends of the members 43 can be connected to the braces 31ˣ at various points in the length of said braces as occasion demands.

Pivoted at 46 between the bars of the levers 30 are bell-cranks 47, the upwardly extending arms of which are pivotally connected at the common points 41 to the links 40 and the rear members 42 of the auxiliary supports. Pivoted to and depending from the lower arm of each bell-crank 47 are links 48, each pair of which is connected with one group of gage shoes 36. Each group of gage shoes 36 is combined with a pair of links 48, a bell-crank 47, a link 40, an auxiliary support and a tractile spring 38, and hence it will be manifest that the spring 38 will yieldingly hold the group of shoes 36 to its work; also, that the said elements combined and relatively arranged as described will enable the gaging shoes to automatically accommodate the topping knives hereinafter described to the beet tops encountered, or in other words will automatically adjust the topping knives to cut off the proper amounts of tops from beets of different sizes.

Fixedly connected to and diverging from the outer sides of the bars of each lever 30 are the shanks 50 of the topping knife 51 complementary to said lever. The said shanks 50 also extend rearward and downward from the point of connection, and the knife 51 is interposed between and fixed to the rear and lower portions of the shanks. In the preferred embodiment of our invention each knife 51 is toothed as shown and is provided with upturned ends each of which is opposed to and connected with the adjacent shank through the medium of a bolt 52 and one or more studs 53; the said stud or studs being disposed above the bolt 52 and having for their purpose to prevent turning of the knife between the shanks.

It will be observed by reference to the drawings that the gaging shoes 36 are in the form of thin blades, and the shoes of each group are held in proper spaced relation by spacing blocks 60 and a bolt 61. It will also be noted from the drawings that the gage shoes 36, the levers 30, and the auxiliary supports (each comprising members 42, 43 and 45) all have a different center of movement, and it is due to this that the bell-cranks 47 are enabled to move in such manner as to change the size of the space between each group of shoes 36 and the adjacent topping knife 51, and in that way regulate the amount of top to be cut from each beet encountered and contribute toward the perfect topping of the beets. This will be better understood when it is stated that there is more top to cut from a beet of large size than from a beet of small size, and the large tops extend a greater distance above the ground than the small tops.

In the operation of the machine and during the progress of the same across a field, a group of gage shoes 36 moves up on each top encountered or in other words each top encountered by a group of shoes raises the group in proportion to the size of the top. The said raising of the group of shoes brings about the elevation of the adjacent knife 51, but the knife rises slower than the group of shoes, and hence the space between the group of shoes and the knife is enlarged to an extent commensurate with the size of the top by which the group of shoes was raised. Immediately after the knife is through cutting the top off a beet the spring 38 complementary to the knife and group of gage shoes mentioned serves to draw the whole cutting apparatus downward, this with a view to restoring the said apparatus to its normal position before the apparatus reaches the next beet in its path. It will be noticed in this connection that the upward motion of the group of shoes 36 increases the thickness of the cut, and the downward movement of said group diminishes the thickness of the cut, and hence the cut made by the adjacent knife is automatically regulated and made to correspond in size to the particular top.

When, however, the beets are of a uniform size and the tops are of a common height, the cutting apparatus will move over the beets in a row and cut the same amount of top from each beet. In other words it is only when the tops are uneven in size and height that the space between a group of gage shoes 36 and the adjacent knife is changed in size. Moreover if there are any beets positioned with their tops or crowns slightly below the surface of the ground, then the retractile spring 38 complementary to each cutting apparatus will cause the knife 51 thereof to cut into the ground until the adjacent group of shoes 36 bears on the crown of the beets, and when said shoes have moved along on the crown of a beet until the rear end of the shoes or some of them are directly on the top of the beet, the shoes will have attained their full capacity to gage, and hence the knife behind the shoes will cut a thickness of top corresponding to the size of the space between the shoes and the adjacent knife.

It will be manifest from the foregoing that by manipulating the levers 29 and adjustably fixing the same, the two cutting mechanisms may be secured in and out of their working positions, and it will also be manifest that by turning the nuts 35 which are in the form of hand wheels, the tension of the springs 38 can be nicely regulated and all of the parts comprised in the cutting mechanisms accurately positioned or adjusted.

Pivoted at 70 to the under side of the longitudinal-central frame bar 13 is a horizontally movable foot lever 71, and fixed to and extending forward from the said lever 71 is a stem 72, pivotally connected at 73 to a cross-bar 74. The said cross-bar 74 is pivotally connected at its ends to the rear ends of links 75 which have their forward ends curved outwardly and fixed to the rock-shafts 6 that carry the spindles on which the forward ground wheels are mounted. By virtue of this construction the operator or driver is enabled by moving the lever 71 to swing the ground wheels 8 and thereby assist materially in guiding the machine.

While the present embodiment of our invention is a two-row machine, we would have it understood that without involving departure from the scope of our invention the cutting mechanisms described can be multiplied and the machines made to cut or top four or more rows of beets at one time. We would also have it understood that a single cutting mechanism constructed in accordance with our invention can be employed without departure from the scope of our claims.

The construction described constitutes the best practical embodiment of our invention of which we are cognizant. We would have if understood, however, that in the future practice of the invention such structural changes or modifications may be made as do not involve departure from the scope of our invention as claimed.

Having described our invention, what we claim and desire to secure by Letters Patent, is:

1. The combination of supporting means, a vertically swinging lever carried thereby, a knife carried by the said lever, a group of gage shoes arranged in front of the knife with their rear portions free to swing vertically; said gage shoes having a different center of movement from the lever, and yielding means connected with the lever and the shoes and constructed and arranged to bring about upward movement of the knife at a lower rate of speed than the shoes when the latter are raised by a beet top over which they are moved.

2. The combination of supporting means, a vertically swinging lever, a knife carried thereby, vertically swinging gage shoes having their rear ends disposed in front of the knife; said shoes being pivoted at their forward ends and having a different center of movement from said lever; a bell-crank pivoted to the lever and connected with the gage shoes, a spring connected with said bell-crank, and auxiliary supporting means connected with the bell-crank and the first-named supporting means; said auxiliary supporting means being rigid.

3. The combination of a supported main frame, a vertically swinging lever connected with the frame, a knife carried by said lever, vertically swinging gage means disposed in front of the knife and connected with the frame and having a different center of movement from the lever, an auxiliary support connected with the main frame, a bell-crank connected with the said connecter and the lever and gage means, a link connected with the auxiliary support and bell-crank, and a retractile spring connected with the said link and the main frame.

4. The combination of a supported main frame, a vertically swinging lever connected with the frame, a knife carried by said lever, a segmental rack fixed on the frame, an upright guide tube fixed to the frame, a lever fulcrumed on the frame, a rod guided in the tube and connected with the first-named lever, a link connecting the rod and the second-named lever, a vertically swinging lever mounted on the main frame, vertically swinging gage means pivoted to said lever and disposed in front of the knife and having a different center of movement from the first-named lever, an auxiliary support connected with the main frame, a bell-crank connected with the said auxiliary support and the first-named lever and gage means, a link connected with the auxiliary support and bell-crank, a retractile spring connected with the said link and the main frame, a rod connected with the third named lever and provided with a thread, a support on the main frame loosely receiving said threaded rod, and a nut mounted on said rod and arranged at the opposite side of said supports with reference to the third-named lever.

5. The combination of a wheel-supported main frame having angular side bars, a tubular cross-bar disposed under the apices of the angular side bars of the frame and fixedly connected therewith and having an opening, a threaded rod extending loosely through said opening, a nut mounted on said rod and disposed against the rear side of the cross-bar, a hanger connected with the main frame, a vertically swinging lever pivotally connected with said hanger, a knife carried by said lever, means connected with said lever and the main frame for adjusting and adjustably fixing the lever, an upright lever fulcrumed on the main frame and having its upper arm connected to said threaded rod, vertically swinging gage means pivoted to the lower arm of said lever and disposed in front of the knife, a vertically swinging auxiliary support pivoted to the frame, a bell-crank pivoted to the lever that carries the knife and also pivoted to the auxiliary support, means connecting said bell-crank and the gage means, a link connected to the bell-crank and the auxiliary support at the point of connection between said bell-crank and auxiliary support, and a retractile spring connecting the said link and the lower arm of the upright lever.

6. The combination of a rectangular main frame having side bars that describe obtuse angles and have the apices of the angles uppermost, a tubular cross-bar disposed below the apices of the said angles, angle-irons fixedly connecting the side bars of the main frame and said cross-bar, ground wheels connected with said tubular cross-bar, a longitudinal central bar fixed to and extending rearward from the rear bar of the main frame, rearwardly converging braces fixed to the rear bar of the main frame and fixedly connected with said longitudinal-central bar and having their greatest widths disposed at right-angles to the greatest width of the longitudinal-central bar, and a caster wheel connected with and supporting the rear portion of the longitudinal-central bar and its braces.

7. The combination of a wheel-supported frame, a vertically swinging lever carried thereby, shanks connected to and diverging from said lever, a knife extending between and fixed to the rear portions of said shanks, a group of gage shoes arranged in front of the knife and mounted to swing vertically and having a different center of movement from the lever, and yielding means connected with the lever and the shoes and constructed and arranged to assure upward movement of the knife at a lower rate of speed than the shoes when the latter are raised by a beet top over which they are moved.

In testimony whereof we have hereunto set our hands in presence of two subscribing witnesses.

FRANK NICKOLAI.
JULIUS E. NICKOLAI.

Witnesses:
G. W. ULLERICK,
F. C. THULLEN.